UNITED STATES PATENT OFFICE.

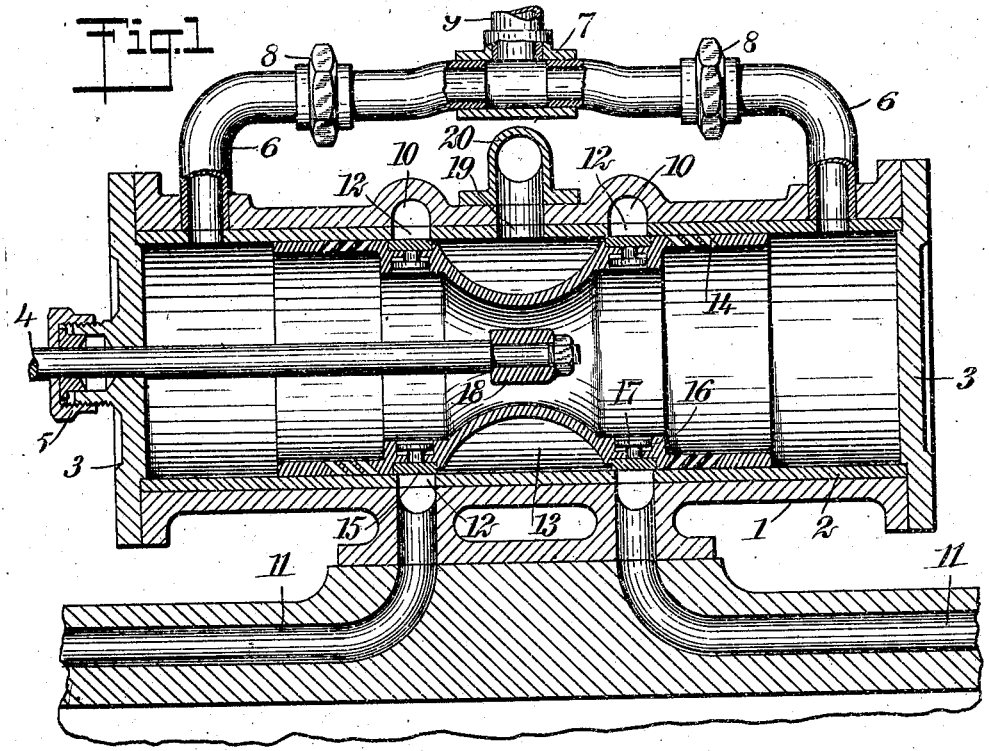
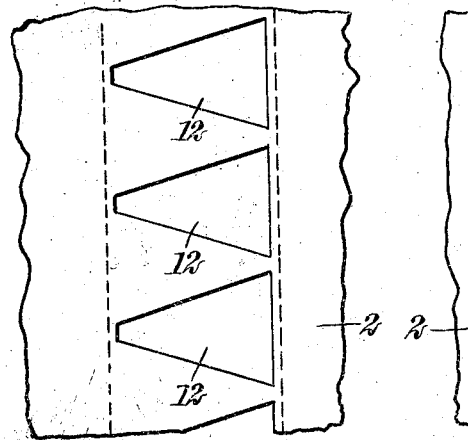
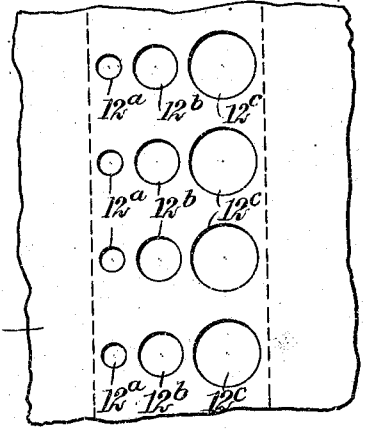

PETER KINANDER, OF MINNEAPOLIS, MINNESOTA.

PISTON-VALVE.

No. 853,803.

Specification of Letters Patent.

Patented May 14, 1907.

Application filed August 28, 1906. Serial No. 332,336.

*To all whom it may concern:*

Be it known that I, PETER KINANDER, a citizen of the United States, and a resident of Minneapolis, in the county of Hennepin and State of Minnesota, have invented a new and Improved Piston-Valve, of which the following is a full, clear, and exact description.

This invention relates to certain improvements in piston valves especially designed for use in controlling the flow of motive fluid to steam engines, hydraulic motors, and the like, although it is evident that the valve may be used for other purposes.

Reference is to be had to the accompanying drawings forming a part of this specification, in which similar characters of reference indicate corresponding parts in all the figures, in which Figure 1 is a longitudinal section through the valve and valve casing; Fig. 2 is an enlarged detail of the port openings through the valve bushing; and Fig. 3 is a modified form of the port openings.

The specific form of the invention which I have illustrated in the drawings involves a cylindrical valve casing 1, having a bushing 2 tightly fitting the inner wall thereof, and having heads 3 rigidly secured to the ends of this cylindrical body. Within the bushing is arranged the valve having its valve stem 4 extending through a packing box 5 in one of the ends of the casings. Opening into the valve casing and bushing at opposite ends thereof, are two pipes 6 united to a T-joint 7 by means of unions 8, whereby the motive fluid entering the T-joint 7 through a pipe 9 may pass to either or both ends of the valve casing. Surrounding the valve casing at points a short distance from each side of the center, are two annular recesses 10, each communicating at one side with one of the conduits 11 extending to the cylinder of the engine or hydraulic motor as the case may be. The bushing 2 at points adjacent these two annular recesses is provided with openings 12, whereby the recesses may communicate with the interior of the bushing, and these openings 12 are preferably so formed that as the valve is opened only a small passage is formed, while as the valve is opened still wider, the size of the passage is very materially increased. These openings 12 may be triangular in shape, as shown in Fig. 2, so that the valve upon opening uncovers merely the pointed end of the triangle, while upon being opened further it uncovers more and more of the triangle toward its base. In Fig. 3 a modified form is shown in which a plurality of openings $12^a$, $12^b$ and $12^c$ are employed and so arranged that the smallest opening $12^a$ is first uncovered, then the larger opening $12^b$ and finally the largest opening $12^c$. It is evident that various different forms of openings may be employed, it only being essential that the openings or arrangement of openings shall be such that their capacity is greatly increased as the valve is opened.

The valve itself comprises a hollow cylindrical casing, having a large annular recess 13 surrounding it at a point intermediate its ends, and having the portion beyond said recess closely fitting the inner wall of the bushing. The outer ends of the valve are provided with a large number of openings 14 which may be brought in communication with the port openings 12 as the valve is moved longitudinally, while the outer wall of the valve at a point intermediate the annular recess 13 and the openings 14 is provided with two packing strips 15 bearing against the bushing and having a plurality of pins 16 extending through the wall of the valve onto the inside, and having enlarged heads 17, so that the steam or other motive fluid within the valve and valve casing may bear against the enlarged heads 17 and keep the packing strip 15 closely in contact with the bushing to make a more efficient joint. The valve being hollow permits of open communication between the two ends of the valve casing at all times, so that it is not positively essential that two pipes 6 be provided, but by the construction shown, a slightly greater freedom of flow is permitted. The valve is secured to the valve stem 4 by a hub 18 carried by radial spokes, not shown, or in any other manner, so that the motive fluid may freely pass through the valve longitudinally. In the valve casing and bushing there is provided an outlet or exhaust passage 19 communicating with a discharge pipe 20 by which motive fluid returning from the cylinder may escape.

The operation of my improved valve is somewhat similar to that of other double valves previously employed but may be described in detail as follows: The motive fluid enters the pipe 9 and completely fills the inner chamber of the valve casing and of the valve but is prevented from flowing to the cylinder while the valve remains in the position as shown. As soon as the valve is moved longitudinally, it brings the openings 14 in communication with the openings 12 and the motive fluid may flow from the valve casing through these openings into one of the annular recesses 10 and thence to one end of the cylinder through one of the pipes 11. Meanwhile, the movement of the valve has brought the other pipe and its annular recess and openings 12 into communication with the annular recess 13 of the valve, so that the motive fluid returning from the other end of the cylinder may freely escape from the pipe 11 into the annular recess 13 and thence to the discharge pipe 20. As one of the rows of ports 12 is opened to permit the discharge of the fluid under pressure to the cylinder, the other row of ports 12 is opened to permit the escape of motive fluid from the opposite end of the cylinder. As the valve is operated it is desirable that the fluid escape from the cylinder as rapidly as possible, and, therefore, I have constructed the port openings 12 of such shape that when the smaller end of one row is being uncovered to permit the fluid under high pressure to pass to the cylinder, the larger end of the other row of ports 12 is opened to present a much larger exhaust passage, so that the motive fluid may escape from one end of the cylinder much faster than it would be supplied to the high pressure side, and most of the exhaust fluid will have escaped by the time the fluid enters the high pressure end at its maximum rate of flow. This is particularly desirable in cases where my improved valve is used in connection with hydraulic motors, as the water cannot pass through the valve as rapidly as can steam, and it is essential that the exhaust port from one side of the cylinder be larger than the inlet port to the other side at the time the direction of the piston in the cylinder is reversed. Various different arrangements of port openings or different shaped openings may be employed, although the style of arrangement as shown in Fig. 2, is highly satisfactory.

As the bushing 2 is removable from the outer casing 1, it is a very simple and easy matter to repair the valve without disconnecting it from the pipe in connection with which it is employed, as all that is necessary is to remove one of the heads 3 and the valve and casing may then be readily taken out without changing any of the connections to the casing.

Having thus described my invention, I claim as new and desire to secure by Letters Patent:

A piston valve, comprising a casing, a bushing located therein, said bushing having two annular rows of ports, a valve within said bushing, said valve being provided with two annular rows of ports and an annular recess, two packing rings carried by said valve and adapted to simultaneously close said rows of ports, and means for reciprocating said valve, the shape of the ports in the bushing being such that when one row of said ports communicates with a row of ports in the valve and the other row of ports communicates with the annular recess of the valve, the flow of motive fluid through one row of ports will be greater than that through the other.

In testimony whereof I have signed my name to this specification in the presence of two subscribing witnesses.

PETER KINANDER.

Witnesses:
W. A. SHIELDS,
W. N. HOLBROOK.